United States Patent
Omoto et al.

(10) Patent No.: US 8,859,632 B2
(45) Date of Patent: Oct. 14, 2014

(54) FOAMED RESIN PRODUCT HAVING SHAPE-FORMABLE PROPERTIES, METHOD OF USING THE SAME AND CUSHION MATERIAL TO BE WORN BY HUMAN BODY

(75) Inventors: Mitsuru Omoto, Anjo (JP); Minoru Kawarabayashi, Anjo (JP); Shunichi Hayashi, Tokyo (JP)

(73) Assignee: INOAC Corporation, Aichi (JP)

( * ) Notice: Subject to any disclaimer, the term of this patent is extended or adjusted under 35 U.S.C. 154(b) by 1291 days.

(21) Appl. No.: 12/671,517

(22) PCT Filed: Jul. 31, 2008

(86) PCT No.: PCT/JP2008/063790
§ 371 (c)(1),
(2), (4) Date: May 11, 2010

(87) PCT Pub. No.: WO2009/020048
PCT Pub. Date: Feb. 12, 2009

(65) Prior Publication Data
US 2010/0291835 A1    Nov. 18, 2010

(30) Foreign Application Priority Data

Aug. 3, 2007 (JP) ................................ 2007-203526

(51) Int. Cl.
*C08G 18/28* (2006.01)
(52) U.S. Cl.
USPC ............................. 521/174; 521/130; 521/131
(58) Field of Classification Search
CPC ............... C08G 18/48; C08G 18/4812; C08G 18/4845; C08G 18/7621; C08G 2101/0008; C08J 9/08; C08J 9/145
USPC .................................... 521/50, 174, 130, 131
See application file for complete search history.

(56) References Cited

U.S. PATENT DOCUMENTS

| | | |
|---|---|---|
| 2004/0029987 A1 | 2/2004 | Sawai |
| 2004/0266897 A1 | 12/2004 | Apichatachutapan et al. |
| 2005/0038131 A1 * | 2/2005 | Narishima et al. ............. 521/50 |

FOREIGN PATENT DOCUMENTS

| | | |
|---|---|---|
| CN | 1456581 | 11/2003 |
| EP | 1801139 A2 * | 6/2007 |
| JP | 2-92912 | 4/1990 |
| JP | 6-239955 | 8/1994 |
| JP | 2002-256052 | 9/2002 |
| JP | 2004-161987 | 6/2004 |
| JP | 2004-285152 | 10/2004 |
| WO | WO 01/25305 | 4/2001 |

OTHER PUBLICATIONS

Chinese Office Action for corresponding CN Application No. 200880024551.4, Jul. 18, 2011.
International Search Report for International Application No. PCT/JP2008/063790.
Japanese Office Action for corresponding JP Application No. 2007-203526, Mar. 19, 2013.
Chinese Office Action for corresponding CN Application No. 200880024551.4, Apr. 19, 2012.
Extended European Search Report for corresponding EP Application No. 08792005.4, Dec. 1, 2011.

* cited by examiner

*Primary Examiner* — John Cooney
(74) *Attorney, Agent, or Firm* — Ditthavong & Steiner, P.C.

(57) ABSTRACT

A foamed resin product having shape-formable properties, a method of using the same and a cushion material that is to be worn by the human body are provided. The foamed resin product (a flexible polyurethane foam, etc.) has a glass transition temperature, expressed as the temperature of the loss tangent peak, of 10° C. to 35° C., a loss tangent within this temperature range of 0.20 to 0.80, and, with respect to the storage elastic modulus (G') within this temperature range, the ratio ($G'_{max}/G'_{min}$) of maximum value ($G'_{max}$) to minimum value ($G'_{min}$) of 3.0 to 30. The using method thereof has attaching a molded article made of the foamed resin product to the surface of the human body, and lowering the hardness of the molded article due to the heat transferred from the human body so as to deform the molded article by allowing to follow-up the shape of the body.

17 Claims, 1 Drawing Sheet

FOAMED RESIN PRODUCT HAVING SHAPE-FORMABLE PROPERTIES, METHOD OF USING THE SAME AND CUSHION MATERIAL TO BE WORN BY HUMAN BODY

FIELD OF THE INVENTION

The present invention relates to a shape-formable resin foam and a using method thereof, and to a cushioning material for attaching to a human body. More specifically, the present invention relates to a shape-formable resin foam in which a glass transition temperature (hereinafter, referred to "Tg" in some case) is in a normal temperature range, and if the temperature is exceeded, the hardness can be easily lowered and the foam can be easily softened, a ratio between the maximum value and the minimum value of storage modulus (hereinafter, referred to "G'" in some case) in the normal temperature range is large, the hardness can be easily changed, and the foam is easily deformed following a shape of a contact target, a using method of the shape-formable resin foam in which the foam is used following a surface shape of a human body while deforming when the foam is attached to the human body and its hardness is lowered by heat transfer from the human body, and a cushioning material in which it is used for attaching to a human body.

PRIOR ART

Until now, a shape-memory polyurethane foam and a low resilience urethane foam have been known. For example, the known shape-memory polyurethane foam is one that is obtained by mixing a diisocyanate, a bifunctional polyol and the like with a specific molar ratio, adding a foaming agent and synthesizing by a prepolymer method, and has a specific glass transition point or the like (see, for example, Patent Document 1). In addition, a production method of a shape-memory polyurethane foam is known in which 4,4'-diphenyl methane diisocyanate and polyoxyalkylene polyol having a large oxyethylene content are reacted at a specific isocyanate index (see, for example, Patent Document 2). Moreover, a shape-memory polyurethane foam having a specific glass transition temperature is known which is obtained by reaction of a starting material containing predetermined amounts of a chain extender and a crosslinking agent (see, for example, Patent Document 3).

Further, a low resilience urethane foam and a production method thereof are known which is obtained by reaction of a composition for urethane foam containing a specific diol compound, has at least one glass transition point in specific different temperature ranges, respectively, and has a peak value of tan δ in the respective temperature ranges at a predetermined value or more when the glass transition point is expressed as the peak value of tan δ (see, for example, Patent Document 4).

[Patent Document 1] JP-A H2-92912
[Patent Document 2] JP-A H6-239955
[Patent Document 3] JP-A 2002-256052
[Patent Document 4] JP-A 2004-285152

DISCLOSURE OF THE INVENTION

Problems that the Invention is to Solve

The shape-memory foams described in Patent Documents 1 to 3 have Tg in a predetermined range including a room temperature and particularly can be used lowering hardness by heat transfer from a human body and deforming while having the foam follow a shape on a body surface, however excellent shape-followability is not examined at all. Additionally, it is indispensable that the foam described in Patent Document 4 has glass transition points in a low temperature range and a room temperature range, by which low resilience urethane foam is generated having excellent low resilience at the room temperature and less hardness-rise even at the low temperature. However, a shape-formable resin foam which has Tg in a predetermined range including a room temperature and lowers the hardness by particularly heat transfer from a human body and is deformed by following a surface shape of a human body, is not disclosed or examined at all, either.

The present invention was made in view of the above circumstances and an object thereof is to provide a shape-formable resin foam in which the Tg is in a normal temperature range, and when the temperature of the foam is higher than the Tg, the hardness can be easily lowered and the foam can be easily softened, a ratio between the maximum value and the minimum value of the G' in the normal temperature range is large, the hardness is easily changed, and the foam is easily deformed following a shape of a contact target. In addition, another object of the present invention is to provide a using method of the shape-formable resin foam in which the foam is used following a surface shape of a human body while deforming when a molded article made up of this shape-formable resin foam is attached to the human body and its hardness is lowered by heat transfer from the human body. Moreover, the present invention has an object to provide a cushioning material such as a pad material including a bra cup, a shoulder pad and the like made of the shape-formable resin foam that are used attaching to a human body.

Means for Solving the Problems

The present invention is as follows.
1. A shape-formable resin foam characterized in that a glass transition temperature which is expressed as a temperature corresponding to a peak value of loss tangent is in the range from 10° C. to 35° C., the loss tangent at a temperature of 10° C. to 35° C. is in the range from 0.20 to 0.80, and a ratio ($G'_{max}/G'_{min}$) between the maximum value ($G'_{max}$) and the minimum value ($G'_{min}$) of the storage modulus (G') at a temperature of 10° C. to 35° C. is in the range from 3.0 to 30.
2. The shape-formable resin foam according to 1 above, wherein the shape-formable resin foam has a ratio ($L_2/L_1$) between a dimension change after 1 second ($L_1$) and a dimensional change after 180 seconds ($L_2$) in a downward dimensional change of a sheet with length of 180×180 mm and a thickness of 10 mm formed using the shape-formable resin foam is in the range from 1.05 to 1.50, when the sheet is fixed at four sides and then a spherical body that has a diameter of 132 mm and a weight of 1,200 g, and is heated to a temperature of 35° C. is loaded at a center part of the sheet.
3. The shape-formable resin foam according to 1 or 2 above, wherein the glass transition temperature is in the range from 15° C. to 35° C., and wherein the ratio ($G'_{max}/G'_{min}$) is in the range from 5.0 to 25.
4. The shape-formable resin foam according to any one of 1 to 3 above, which is a flexible polyurethane foam.
5. The shape-formable resin foam according to 4 above, wherein the flexible polyurethane foam is obtained by foaming and hardening a starting material comprising a polyol, a polyisocyanate, and a foaming agent, wherein the polyol is a polyether polyol, wherein the polyether polyol contains two or more kinds of polyether polyol, wherein one type of which is a polyether polyol (A) having a hydroxyl value of 200 to 500, and wherein a content of the polyether polyol (A) is in the range from 35% to 85% by weight based on 100% by weight of the total of the polyether polyol.

6. The shape-formable resin foam according to 5 above, wherein the polyether polyol comprises a polyether polyol (B-1) having a hydroxyl value of 40 to 100 and a functional group number of 3 and a polyether polyol (B-2) having a hydroxyl value of 40 to 100 and a functional group number of 2, and wherein a content of the polyether polyol (B-2) is in the range from 5% to 25% by weight based on 100% by weight of the total of the polyether polyol.

7. The shape-formable resin foam according to 5 or 6 above, wherein the polyether polyol is obtained by chain extension using an alkylene oxide, and wherein the alkylene oxide contains propylene oxide in an amount of 80% or more by weight based on 100% by weight of the alkylene oxide.

8. The shape-formable resin foam according to any one of 5 to 7 above, wherein the polyisocyanate is toluene diisocyanate.

9. The shape-formable resin foam according to any one of 4 to 8 above, wherein an isocyanate index for the production of the flexible polyurethane foam is in the range from 100 to 120.

10. The shape-formable resin foam according to 1 above, wherein the shape-formable resin foam has a ratio ($L_2/L_1$) between a dimension change after 1 second ($L_1$) and a dimensional change after 180 seconds ($L_2$) in a downward dimensional change of a sheet with length of 180×180 mm and a thickness of 10 mm formed using the shape-formable resin foam is in the range from 1.05 to 1.50, when the sheet is fixed at four sides and then a spherical body that has a diameter of 132 mm and a weight of 1,200 g, and is heated to a temperature of 35° C. is loaded at a center part of the sheet, wherein the shape-formable resin foam is a flexible polyurethane foam obtained by foaming and hardening a starting material containing polyol, polyisocyanate, and a foaming agent, wherein the polyol is a polyether polyol, wherein the polyether polyol contains a polyether polyol (A) having a hydroxyl value of 200 to 500, a polyether polyol (B-1) having a hydroxyl value of 40 to 100 and a functional group number of 3, and a polyether polyol (B-2) having a hydroxyl value of 40 to 100 and a functional group number of 2, wherein contents of the polyether polyol (A) and the polyether polyol (B-2) are respectively 35% to 85% by weight and 5% to 25% by weight based on 100% by weight of the polyether polyol, wherein the polyether polyol is obtained by chain extension using an alkylene oxide, wherein the alkylene oxide contains propylene oxide in an amount of 80% or more by weight based on 100% by weight of the alkylene oxide, wherein the polyisocyanate is toluene diisocyanate, and wherein an isocyanate index for the production of the flexible polyurethane foam is in the range from 100 to 120.

11. A method of using the shape-formable resin foam according to any one of 1 to 10 above, characterized in that a molded article made of the shape-formable resin foam is used by comprising: attaching the molded article to a surface of a human body, and lowering the hardness of the molded article due to heat transferred from the human body so as to deform the molded article by allowing to follow-up the shape of the body surface.

12. The method of using the shape-formable resin foam according to 11 above, wherein the shape-formable resin foam is a flexible polyurethane foam obtained by foaming and hardening a starting material containing polyol, polyisocyanate, and a foaming agent, wherein the polyol is a polyether polyol, wherein the polyether polyol contains a polyether polyol (A) having a hydroxyl value of 200 to 500, a polyether polyol (B-1) having a hydroxyl value of 40 to 100 and a functional group number of 3, and a polyether polyol (B-2) having a hydroxyl value of 40 to 100 and a functional group number of 2, wherein contents of the polyether polyol (A) and the polyether polyol (B-2) are respectively 35% to 85% by weight and 5% to 25% by weight based on 100% by weight of the polyether polyol, wherein the polyether polyol is obtained by chain extension using an alkylene oxide, wherein the alkylene oxide contains propylene oxide in an amount of 80% or more by weight based on 100% by weight of the alkylene oxide, wherein the polyisocyanate is toluene diisocyanate, and wherein an isocyanate index for the production of the flexible polyurethane foam is in the range from 100 to 120.

13. A cushioning material for attaching to a human body characterized in that the cushioning material is consisting of a molded article made of the shape-formable resin foam according to any one of 1 to 10 above.

14. The cushioning material for attaching to a human body according to 13 above, wherein the molded article is a bra cup.

Effect of the Invention

According to the present invention, the shape-formable resin foam has a normal temperature range, and when the temperature is exceeded, the hardness of the foam can be easily lowered and the foam can be easily softened, a ratio between the maximum value and the minimum value of G' in the normal temperature range is large, the hardness is easily changed, and the foam can be easily deformed following a shape of a contact target.

Additionally, in the case where the shape-formable resin foam has a ratio ($L_2/L_1$) between a dimension change after 1 second ($L_1$) and a dimensional change after 180 seconds ($L_2$) in a downward dimensional change of a sheet with length of 180×180 mm and a thickness of 10 mm formed using the shape-formable resin foam is in the range from 1.05 to 1.50, when the sheet is fixed at four sides and then a spherical body that has a diameter of 132 mm and a weight of 1,200 g, and is heated to a temperature of 35° C. is loaded at a center part of the sheet, not only that deformation is large when the contact target is touched but also that the deformation continues, though slightly, over time after that and strain distribution is made uniform, and deformation to the shape more proximate to the contact target can be realized.

Moreover, in the case where the glass transition temperature is in the range from 15° C. to 35° C., and where the ratio ($G'_{max}/G'_{min}$) is in the range from 5.0 to 25, the hardness of the foam is largely changed at ease and the compression residual strain becomes small. Thus, the foam can be deformed more easily, following the shape of the contact target. When the foam is separated from the contact target, the shape can be recovered easily.

Additionally, in the case where the shape-formable resin foam is a flexible polyurethane foam, it is a resin foam capable of shape-following more easily and sufficiently.

Furthermore, in the case where the flexible polyurethane foam is obtained by foaming and hardening a starting material comprising a polyol, a polyisocyanate, and a foaming agent, wherein the polyol is a polyether polyol, wherein the polyether polyol contains two or more kinds of polyether polyol, wherein one type of which is a polyether polyol (A)

having a hydroxyl value of 200 to 500, and wherein a content of the polyether polyol (A) is in the range from 35% to 85% by weight based on 100% by weight of the total of the polyether polyol, a flexible polyurethane foam can be obtained in which the hardness is lowered, the resilience elasticity and compression residual strain are small, and shape-folllowability is excellent.

Moreover, in the case where the polyether polyol comprises a polyether polyol (B-1) having a hydroxyl value of 40 to 100 and a functional group number of 3 and a polyether polyol (B-2) having a hydroxyl value of 40 to 100 and a functional group number of 2, and wherein a content of the polyether polyol (B-2) is in the range from 5% to 25% by weight based on 100% by weight of the total of the polyether polyol, a resin foam having a low hardness can be obtained more easily and a flexible polyurethane foam capable of changing the hardness easily and having excellent shape-followability.

Further, in the case where the polyether polyol is obtained by chain extension using an alkylene oxide, and wherein the alkylene oxide contains propylene oxide in an amount of 80% or more by weight based on 100% by weight of the alkylene oxide, a foam can be obtained which is consisting of a uniform resin and has little microphase separation structure can be obtained. And the foam is one whose tan δ has a single peak, and is a shape-formable resin foam having a specific characteristic.

Additionally, in the case where the polyisocyanate is a toluene diisocyanate, a light-weighed flexible polyurethane foam can be obtained in which Tg is prevented from being too high, and the hardness is lowered.

Further, in the case where the isocyanate index for the production of a flexible polyurethane foam is in the range from 100 to 120, the foam is compressed and deformed following the shape of an attached portion when the foam is attached to a human body, and the moist heat compression residual strain can be suppressed. Thus, even if the foam is brought into close contact with the human body, the compression residual strain due to moist heat from the human body does not matter.

According to the using method of the shape-formable resin foam of the present invention, hardness of a molded article made of the resin foam can be easily lowered by heat transfer from the human body and can be used deforming while following the surface shape of the body.

In the cushioning material for attaching to a human body of the present invention, when the cushioning material is attached to the human body, the hardness can be lowered by heat transfer from the human body and can be deformed easily following the surface shape of the body, and wearing feeling is excellent.

Additionally, in the case where the molded article is a bra cup, it has hardness with which the shape when not in use can be easily maintained, its designability is not lost. When the bra cup is used, a temperature is raised by attaching to a human body and sufficient shape-followability is exerted. Further, the foam is not too hard but excellent in wearing feeling, and sufficient shape retaining performance is provided.

DESCRIPTION OF THE PREFERRED EMBODIMENTS

Figure 1:
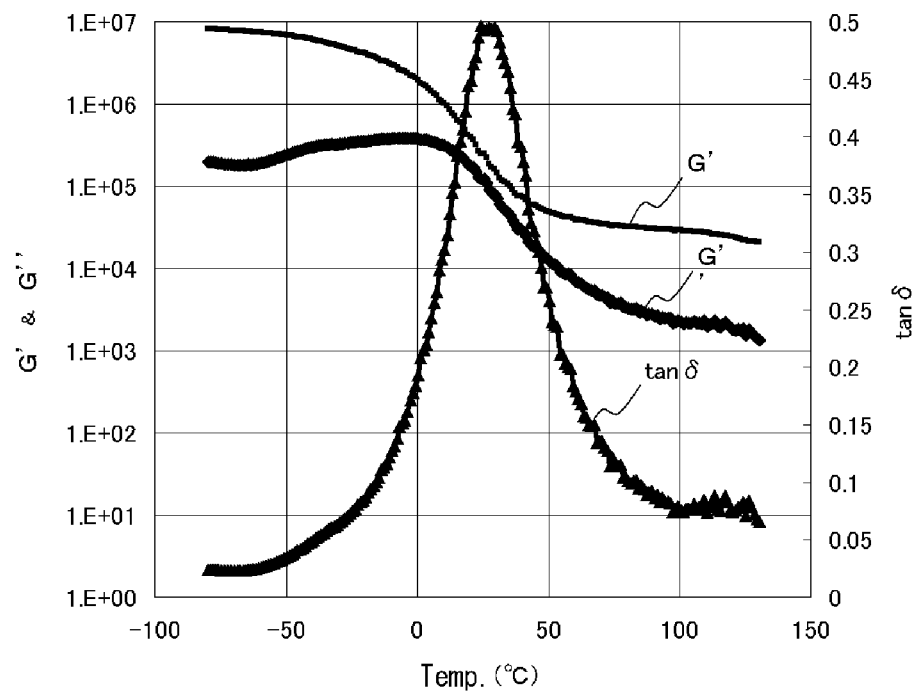
FIG. 1 is a graph illustrating correlation between a temperature, and G', G'', or tan δ in viscoelasticity measurement of the PU foam in Example 8.

Hereinafter, the present invention is described in detail.
[1] Shape-Formable Resin Foam The shape-formable resin foam is characterized in that a Tg which is expressed as a temperature corresponding to a peak value of loss tangent (hereinafter, abbreviated as "tan δ") is in the range from 10° C. to 35° C., the tan δ at the temperature range is in the range from 0.20 to 0.80, and a ratio ($G'_{max}$/$G'_{min}$) between the maximum value ($G'_{max}$) and the minimum value ($G'_{min}$) of the storage modulus (G') at the temperature range is in the range from 3.0 to 30.

The above-mentioned "Tg" is expressed as a temperature corresponding to a peak value of tan δ, and this Tg is in the range from 10° C. to 35° C., preferably from 15° C. to 35° C., and particularly from 20° C. to 32° C. When the Tg is in the range from 10° C. to 35° C., the hardness of the foam is easily lowered to be a resin foam having excellent shape-followability.

Additionally, when a molded article made of a resin foam is used attaching to a human body, the Tg is preferably proximate to a temperature of the body surface (as will be described later, it is not a so-called body temperature but a temperature on a surface of a face, a chest and the like and is in the range from 28° C. to 30° C.). Therefore, when the molded article is used attaching to a human body, the Tg is preferably in the range from 25° C. to 32° C., and particularly from 27° C. to 32° C. In the case where the Tg is in the range from 25° C. to 32° C., hardness is sufficiently lowered on the body surface side of the molded article due to heat transfer from the human body and the foam is softened, and sufficient hardness is maintained on the outer surface side rather than on the body surface side. Therefore, pressure applied on the body surface is distributed and alleviated, and the shape-formable resin foam having excellent wearing feeling and also sufficient shape retaining performance can be obtained.

The above-mentioned "tan δ" is a value obtained by dividing the loss modulus (G'') by G', that is, G''/G'. This tan δ is in the range from 0.20 to 0.80 and preferably from 0.30 to 0.80. In the case where the tan δ is in the range from 0.20 to 0.80, when the molded article made of the resin foam is used attaching to a human body in particular, a wearer does not feel a sense of discomfort in lowered hardness and shape-formable but wearing feeling is excellent. Moreover, a ratio ($G'_{max}$/$G'_{min}$) between the maximum value ($G'_{max}$) and the minimum value ($G'_{min}$) is in the range from 3.0 to 30 and preferably from 5.0 to 25. In the case where the ratio of G' is in the range from 3.0 to 30, the hardness does not become too high and the hardness is sufficiently changed. When the molded article made of the resin foam is used attaching to a human body, a wearer can feel the change of hardness. In the case where the ratio of G' is less than 3.0, when the molded article is attached to a human body, the hardness change is hardly felt, and sufficient function as a cushioning material for attaching to a human body can not be expected. On the other hand, if the ratio of G' exceeds 30, the hardness at a normal state (initial state) is high, which is not suitable for a cushioning material to be used attaching to a human body.

In a temperature range of 10° C. to 35° C., G' is normally lowered as the temperature is raised. Thus, the ratio of G' is a value by calculating "G' (maximum value) at 10° C./G' (minimum value) at 35° C.".

The shape-formable resin foam of the present invention is largely deformed at the time when stress is applied, and then, the deformation gets gradually large, and strain distribution is made uniform at the same time. Thus, particularly when the molded article made of the resin foam is used attaching to a human body, the wearer can feel the lowered hardness and shape-followability, and the feeling of wearing is excellent. This lowered hardness and shape-followability can be evaluated by a method in which a sheet having a predetermined dimension molded by using the resin foam is fixed at four sides, and then, a spherical body having a predetermined dimension, weight and temperature is loaded at a center part thereof so that a change over time in the downward dimensional change of the sheet is calculated. The ratio ($L_2/L_1$) is preferably in the range from 1.05 to 1.50, more preferably from 1.1 to 1.50, and further preferably from 1.20 to 1.50. When the ratio ($L_2/L_1$) is in the range from 1.05 to 1.50, the wearer can sufficiently feel the lowered hardness and change in the shape-formable over time.

The shape-formable resin foam is not particularly limited and examples of the shape-formable resin foam include a polyurethane foam, a thermoplastic elastomer foam using a styrene-based thermoplastic elastomer, an olefin-based thermoplastic elastomer and the like, a polyolefin foam such as polyethylene foam, and the like. Additionally, the foam may be a foam of a resin mixture or a foam of a mixture of a thermoplastic elastomer and a polyolefin, such as a styrene-based thermoplastic elastomer and polyethylene. The shape-formable resin foam is preferably a polyurethane foam whose Tg can be easily adjusted, and a flexible polyurethane foam (hereinafter referred to as "PU foam") which is not excessively rigid in a temperature range of a glass state lower than the Tg and whose softness is maintained is more preferable.

The following is a detail description of the case in which the shape-formable resin foam is a PU foam.

The PU foam can be manufactured by foaming and hardening a starting material for the foam containing a polyol, a polyisocyanate and a foaming agent.

The polyol can be used without particular limitation so long as the polyol is generally used for the production of a PU foam. The polyol is preferably a polyether polyol, and the polyether polyol obtained by adding and chain-extending an alkylene oxide to an initiator such as ethylene glycol, propylene glycol, glycerin, trimethylol propane, hexane triol, pentaerythritol and the like can be used. For the PU foam according to the present invention, all of the polyol is preferably a polyether polyol.

It is preferable that the polyol is preferably polyether polyol in the full amount, and contains a polyether polyol (A) having hydroxyl value of preferably from 200 to 500 and particularly from 200 to 350. When the polyol having a low molecular weight is used, a PU foam having Tg in the room temperature range can be obtained. The content of this polyether polyol (A) is not particularly limited, and is preferably in the range from 35% to 85% by weight, and particularly from 45% to 75% by weight based on 100% by weight of the total of the polyether polyol. In addition, the number of functional group of the polyether polyol (A) is not particularly limited, but bifunctional and trifunctional is preferable, and trifunctional is more preferable.

For the polyether polyol, the polyether polyol (A) having a relatively low molecular weight and a polyether polyol having a relatively high molecular weight are preferably used in combination. The polyether polyol having a relatively high molecular weight may be used singly or in combination of two or more types thereof. The functional group number thereof is not particularly limited and is preferably bifunctional and trifunctional. In the case of using one kind of the polyol, trifunctional is preferred.

The above polyether polyol having a relatively high molecular weight preferably contains at least one of a trifunctional polyether polyol (B-1) having hydroxyl value of 40 to 100 and a bifunctional polyether polyol (B-2) having hydroxyl value of 40 to 100. Further, both these polyether polyols (B-1) and (B-2) are contained. In the case where one kind of the polyol is contained, the trifunctional polyether polyol (B-1) is preferably used. The contents of the polyether polyols (B-1) and (B-2) are not particularly limited. The content of the polyether polyol (B-1) is preferably in the range from 5% to 45% by weight based on 100% by weight of the total of the polyether polyol. Additionally, when the bifunctional polyether polyol (B-2) is used with the polyether polyol (B-1), excessive high hardness in the normal temperature range (10° C. to 35° C.) can be avoided. Since the strain resistance is lowered (compression residual strain becomes larger) with increase of the content, the content of the polyether polyol (B-2) is preferably 25% or less by weight, more preferably from 5% to 25% by weight, and particularly from 10% to 20% by weight.

The polyether polyol may contain other polyether polyol except the polyether polyols (A) and (B-1) and/or (B-2). In that case, the total content of the polyether polyols (A) and (B-1) and/or (B-2) is preferably 80% or more by weight, and particularly 90% or more by weight based on 100% by weight of the polyether polyol. The total content of the polyether polyols (A) and (B-1) and/or (B-2) may be 100% by weight.

Examples of the alkylene oxide for chain extension include ethylene oxide, propylene oxide, butylene oxide and the like. These compounds may be used singly or in combination of two or more types thereof. In the case where two or more types of the alkylene oxides are used, the amount of a specific kind of the alkylene oxide is preferably 80% or more by weight and particularly 95% or more by weight based on 100% by weight of the total amount of the alkylene oxide. The above amount leads to a PU foam having a peak of tan δ present only in the temperature range of 10° C. to 35° C. Further, the alkylene oxide is particularly used singly and the only one alkylene oxide is preferably a propylene oxide.

The polyisocyanate is not particularly limited, and various kinds of polyisocyanate having two or more terminal isocyanate groups can be used. Examples of the polyisocyanate include toluene diisocyanate (TDI), crude TDI, 4,4'-diphenyl methane diisocyanate (MDI), crude MDI, 1,6-hexamethylene diisocyanate (HDI), crude HDI, 1,5-naphthalene diisocyanate, paraphenylene diisocyanate, 2,2,4-trimethyl hexamethylene diisocyanate, 4,4'-dicyclohexylmethane diisocyanate, m-xylene diisocyanate, hexamethylene diisocyanate, hydrogenated HDI, isophorone diisocyanate and the like. The polyisocyanate may be used singly or in combination of two or more types thereof. The polyisocyanate is preferably used a TDI, and more preferably is only a TDI. When the TDI is used as the polyisocyanate, a light-weight and flexible PU foam can be obtained and Tg thereof can be prevented from being too high.

It is noted that MDI used in a variety of applications is not preferable since Tg in the case of the PU foam according to the present invention becomes too high, the foam becomes too hard in the normal temperature range and in attaching to a human body, and moreover, the foam cannot be light weighted. Further, TDI is more inexpensive than MDI, which has a cost merit.

A formulating amount of the polyisocyanate is preferably set according to physical characteristics and the like required for the PU foam. The amount thereof is adjusted based on isocyanate index. The isocyanate index is not particularly limited and is preferably in the range from 100 to 120, more preferably from 105 to 120, and particularly from 105 to 115. When the isocyanate index is set at 100 or more, an unreacted polyol can be reduced. In addition, the foam can be easily deformed following the shape of an attached portion when the foam is attached to a human body, and moist heat compression residual strain can be suppressed. Thus, in the case where the foam is tightly attached to the human body, strain caused by moist heat from the human body does not matter.

The foaming agent is not particularly limited and various types of foaming agent capable of foaming a reaction product of a polyisocyanate and a polyol can be used. Examples of the foaming agent include (1) water, (2) an aliphatic hydrocarbon halide such as methylene chloride and trichloroethane, (3) carbon dioxide, (4) an inorganic foaming agent such as sodium bicarbonate, ammonium carbonate, ammonium bicarbonate, ammonium nitrite and azide compound, and (5) an organic foaming agent such as azodicarbonamide, azobisformamide and N,N'-dinitrosopentamethylenetetramine that are generally used in manufacture of the PU foam. The foaming agent may be used singly or in combination of two or more types thereof. Water is preferable as the foaming agent. Various types of water such as ion exchange water, tap water and distilled water can be used. The formulating amount of the foaming agent is preferably in the range from 0.5 to 5.0 parts by weight, more preferably from 0.5 to 4.0 parts by weight, and particularly from 1.0 to 3.0 parts by weight based on 100 parts by weight of the total amount of the polyol.

Into the starting material for the foam, a foam control agent, a catalyst and the like are generally incorporated in addition to the polyol, the polyisocyanate and the foaming agent.

The foam control agent is formulated in order to stabilize uniformly distributed fine air bubbles. The foam control agent is not particularly limited and a block copolymer of dimethyl polysiloxane and polyether can be used. Additionally, a specific foam control agent obtained by adding an organic functional group to a polysiloxane can be used. A silicone foam control agents are often used as the foam control agent. The foam control agent may be used singly or in combination of two or more types thereof. The formulating amount of the foam control agent is preferably in the range from 0.5 to 3 parts by weight and more preferably from 0.7 to 2 parts by weight based 100 parts by weight of the total of the polyol.

The catalyst is not particularly limited and various types of catalyst can be used. Examples of the catalyst include an amine based catalyst, a metal catalyst and the like. Examples of the amine based catalyst include triethylenediamine, tetramethylguanidine, N,N,N',N'-tetramethylhexane-1,6-diamine and the like. Examples of the metal catalyst include dibutyltin dilaurate, potassium octylate, lead naphthenate, zinc neodecanoate and the like. The catalyst may be used singly or in combination of two or more types thereof. When the catalyst is used in combination, the amine based catalyst and metal catalyst or the like may be combined. The formulating amount of the catalyst is not particularly limited and is preferably in the range from 0.1 to 2 parts by weight, more preferably from 0.1 to 1 part by weight, and particularly from 0.2 to 0.5 part by weight based on 100 parts by weight of the total amount of the polyol.

The starting material for the foam may contain other additives, auxiliary agents and the like. Examples of these additives, auxiliary agents and the like include an antioxidant, an ultraviolet absorber, a coloring agent, a variety of dilution agent for lowering viscosity of the starting material for the foam or facilitating agitation and mixing, and the like. These additives, auxiliary agents and the like may be formulated in appropriate amounts in a range not impairing the working effects of the present invention.

[2] Using Method of Shape-Formable Resin Foam

The using method of the shape-formable resin foam of the present invention is characterized in that a molded article made of the shape-formable resin foam is used by comprising attaching the molded article to a surface of a human body, and lowering the hardness of the molded article due to heat transferred from the human body so as to deform the molded article by allowing to follow-up the shape of the body surface.

The molded article is usually used in a state covered by a woven cloth or the like on the entire surface. Therefore, the molded article is attached to a body surface of a human through the woven cloth or the like.

The shape-formable resin foam of the present invention is particularly useful when a molded article made of this resin foam is attached to a surface of a human body. A so-called body temperature measured in a mouth, an underarm or the like is normally slightly above 36° C. The surface temperature on a face, a chest, a hip, a hand and a foot and the like is in the range from 28° C. to 30° C., though there is some difference depending on the portion, which is slightly lower than the body temperature. The shape-formable resin foam of the present invention has a Tg in the range from 10° C. to 35° C., and when the molded article made of this resin foam is attached to the body surface within the above temperature range, the hardness may be easily lowered so that the foam may be softened, and the shape of the contact portion can be followed so that the foam can be easily deformed.

Moreover, the molded article made of the shape-formable resin foam is deformed following the shape of an attached portion in a relatively short time, when it is brought into contact with the body surface. After the attachment, the molded article is further deformed, though slightly, over time and is deformed to the shape more proximate to the shape of the attached portion. Therefore, the wearer can feel the shape-formable of the molded article to the attached portion better. The pressure applied to the body surface is distributed and alleviated, thus excellent feeling of wearing can be obtained.

[3] Cushioning Material for Attaching to Human Body

The cushioning material for attaching to a human body of the present invention is characterized in that the cushioning material is consisting of a molded article made of the shape-formable resin foam. Examples of the cushioning material for attaching to a human body includes a bra cup; a shoulder pad; an insole; a cushioning material such as a knee pad and a leg pad that are used in sport; a cushioning material in a helmet; and the like. Since the cushioning material for attaching to a human body of the present invention is made of the molded article having the above excellent shape-followability, the wearer can feel the shape-followability of the molded article to the attached portion better. Additionally, the pressure applied to the body surface is distributed and alleviated, thus excellent feeling of wearing can be obtained.

EXAMPLES

Hereinafter, the present invention is described using Examples in detail.

[1] Production of Foam (1) PU Foam

Examples 1 to 11 and Comparative Examples 1 to 7

All PU foams were manufactured by a one-shot method. The starting material for a foam was supplied to a mixing head according to a mixing ratio described in Tables 1 to 4, and was stirred in the head. Then a mixed liquid was discharged onto a moving belt conveyer and was naturally foamed on the conveyer at a normal temperature (15° C. to 25° C.) and under the atmospheric pressure. After that, the material was hardened in a curing furnace controlled to a temperature of approximately 60° C. by steam and was cured to form a PU foam.

Numeral values in Tables 1 to 4 indicate incorporating amounts (unit: parts by weight) when the total amount of a polyol is 100 parts by weight.

TABLE 1

|  | Example | | | | | | |
| --- | --- | --- | --- | --- | --- | --- | --- |
|  | 1 | 2 | 3 | 4 | 5 | 6 | 7 |
| Polyol (A) | 40 | 50 | 50 | 70 | 80 | 80 | 50 |
| Polyol (B-1) | 40 | 40 | 30 | 20 | 10 | 20 | 20 |
| Polyol (B-2) | 20 | 10 | 20 | 10 | 10 | — | 30 |
| Foaming agent | 2.1 | 2.1 | 2.1 | 2.1 | 2.1 | 2.1 | 2.1 |
| Foam control agent | 1.2 | 1.2 | 1.2 | 1.2 | 1.2 | 1.2 | 1.2 |
| Catalyst | 0.7 | 0.7 | 0.7 | 0.7 | 0.7 | 0.7 | 0.7 |
| Polyisocyanate (A) | 42.5 | 45.3 | 45.2 | 50.8 | 53.5 | — | 45.1 |
| Polyisocyanate (B) | — | — | — | — | — | 53.6 | — |
| Index | 105 | 105 | 105 | 105 | 105 | 105 | 105 |

TABLE 2

|  | Example | | | | |
| --- | --- | --- | --- | --- | --- |
|  | 8 | 9 | 10 | 11 | 12 |
| Polyol (A) | 70 | 70 | 80 | 100 | HSBR foam |
| Polyol (B-1) | 20 | 20 | 20 | — | |
| Polyol (B-2) | 10 | 10 | — | — | |
| Foaming agent | 2.1 | 2.1 | 1.5 | 2.1 | |
| Foam control agent | 1.2 | 1.2 | 1.2 | 1.2 | |
| Catalyst | 0.7 | 0.7 | 0.7 | 0.7 | |
| Polyisocyanate (A) | 53.2 | 55.6 | 47.5 | 50.7 | |
| Polyisocyanate (B) | — | — | — | — | |
| Index | 110 | 115 | 105 | 90 | |

TABLE 3

|  | Comparative Example | | | | |
| --- | --- | --- | --- | --- | --- |
|  | 1 | 2 | 3 | 4 | 5 |
| Polyol (A) | 100 | 20 | 30 | — | — |
| Polyol (B-1) | — | 50 | 50 | 100 | 100 |
| Polyol (B-2) | — | 30 | 20 | — | — |
| Foaming agent | 2.1 | 2.1 | 2.1 | 3.9 | * |
| Foam control agent | 1.2 | 1.2 | 1.2 | 1.2 | 1.2 |
| Catalyst | 0.7 | 0.7 | 0.7 | 0.4 | 0.4 |
| Polyisocyanate (A) | 56.3 | 36.9 | 39.7 | — | — |
| Polyisocyanate (B) | — | — | — | 51.1 | 39.6 |
| Index | 100 | 105 | 105 | 110 | 105 |

* As the foaming agent, 3.0 parts by weight of water and 12.0 parts by weight of methylene chloride were used.

TABLE 4

|  | Comparative Example | | |
| --- | --- | --- | --- |
|  | 6 | 7 | 8 |
| Polyol (A) | 70 | 70 | HSBR Foam |
| Polyol (B-1) | 20 | 20 | |
| Polyol (B-2) | 10 | 10 | |
| Foaming agent | 2.1 | 2.1 | |
| Foam control agent | 1.2 | 1.2 | |
| Catalyst | 0.7 | 0.7 | |
| Polyisocyanate (A) | 43.5 | 59.0 | |
| Polyisocyanate (B) | — | — | |
| Index | 90 | 122 | |

Details of the starting material for the foam in Tables 1 to 4 are as follows:

Polyol (A); polyether polyol (trade name "G700" manufactured by ADEKA Corp.), hydroxyl value 240 mgKOH/g, trifunctional, propylene oxide adduct (100% by weight), Polyol (B-1); polyether polyol (trade name "GP3000" manufactured by Sanyo Chemical Industries, Ltd.), hydroxyl value 56 mgKOH/g, trifunctional, propylene oxide adduct (100% by weight), Polyol (B-2); polyether polyol (trade name "PP-2000" manufactured by Sanyo Chemical Industries, Ltd.), hydroxyl value 56 mgKOH/g, bifunctional, propylene oxide adduct (100% by weight), Foaming agent; water (water and methylene chloride were used in Comparative Example 5), Foam control agent; silicone-based foam control agent for PU foam (trade name "L-626" manufactured by GE Toshiba silicones), Catalyst; mixture of triethyelnediamine and propylene glycol in a weight ratio of 1:2 (trade name "LV33" manufactured by Chukyo Yushi Co., Ltd.), Polyisocyanate (A); toluene diisocyanate containing 2,4-isomer in an amount of 65% by weight (trade name "T65" manufactured by Nippon Polyurethane Industry Co., Ltd.), Polyisocyanate (B); toluene diisocyanate containing 2,4-isomer in an amount of 80% by weight (trade name "T80" manufactured by Nippon Polyurethane Industry Co., Ltd.).

(2) Hydrogenated Styrene-Butadiene Based Resin Foam

Examples 12 and Comparative Example 8

A resin composition containing a hydrogenated styrene-butadiene based resin (hereinafter, abbreviated as "HSBR", trade name "SQE-SS9000" manufactured by Asahi Kasei Corp.), a low-density polyethylene (trade name "NUC8505" manufactured by Nippon Unicar Company Ltd.), a foaming agent, a crosslinking agent and an auxiliary agent was subjected to foaming while crosslinking with a foaming magnification of 10 times to form a hydrogenated styrene-butadiene based resin foam (hereinafter referred to as "HSBR foam". Also, noted as "HSBR foam" in Tables 2 and 4). In Example 12, 90 parts by weight of HSBR and 10 parts by weight of the low-density polyethylene were used, while in Comparative Example 8, 70 parts by weight of HSBR and 30 parts by weight of the low-density polyethylene were used (based on 100 parts by weight of the total of HSBR and the low-density polyethylene). The Tg of the HSBR foam was adjusted with weight ratio of these resins.

[2] Measurement of Physical Characteristics

PU foams in Examples 1 to 11 and Comparative Examples 1 to 7 and HSBR foams in Example 12 and Comparative Example 8 were subjected to physical measurements in the following.

(1) Measurement is made for Density ($kg/m^3$), 25% hardness (kPa), modulus of resilience elasticity (%) and compression residual strain (%) were measured according to JIS K 7222, JIS K 6400-2, JIS K 6400-3 and JIS K 6400-4, respectively.

(2) Moist heat compression residual strain (%) was measured in the same manner as the above compression residual strain after exposing a sample to an atmosphere at a temperature of 70° C. and a relative humidity of 95% for 22 hours and then cooling it to a room temperature.

The compression residual strain (%) and moist heat compression residual strain (%) of the PU foam are measured values at 50% compression. Additionally, the compression residual strain (%) (numeral values in parentheses in Tables 6 and 8) of the HSBR foam is a measured value at 25% compression.

(3) Storage modulus (G') and loss elastic modulus (G") were measured at a temperature range from −80° C. to 130° C. (for PU foam) or −50° C. to 80° C. (for HSBR foam), a heating rate of 6° C./minute and a frequency of 1 Hz using a thermal analysis instrument (type name "RDA-700" manufactured by Rheometrix Scientific Inc.) to calculate tan δ by the following equation:

$$\tan \delta = G''/G'$$

And, a temperature corresponding to a peak value of tan δ was settled into a glass transition temperature (° C.).

Moreover, a value obtained by dividing G' at 10° C. by G' at 35° C. was settled into a ratio of storage modulus (G').

(4) Relaxation time was evaluated by fixing a sheet having length of 180 mm×180 mm and a thickness of 10 mm molded using the PU foam and the HSBR foam at four sides, measuring a downward dimensional change (mm) when a spherical body having a diameter of 132 mm, a weight of 1,200 g, and a temperature of 35° C. was loaded at a center part of the sheet at times that 1, 10, 180 and 600 seconds, respectively have elapsed since the loading, and then calculating a ratio ($L_2/L_1$) between a value after 1 second ($L_1$) and a value ($L_2$) after 10, 180 and 600 seconds. Results are as shown in Tables 5 to 8.

Figure 2:
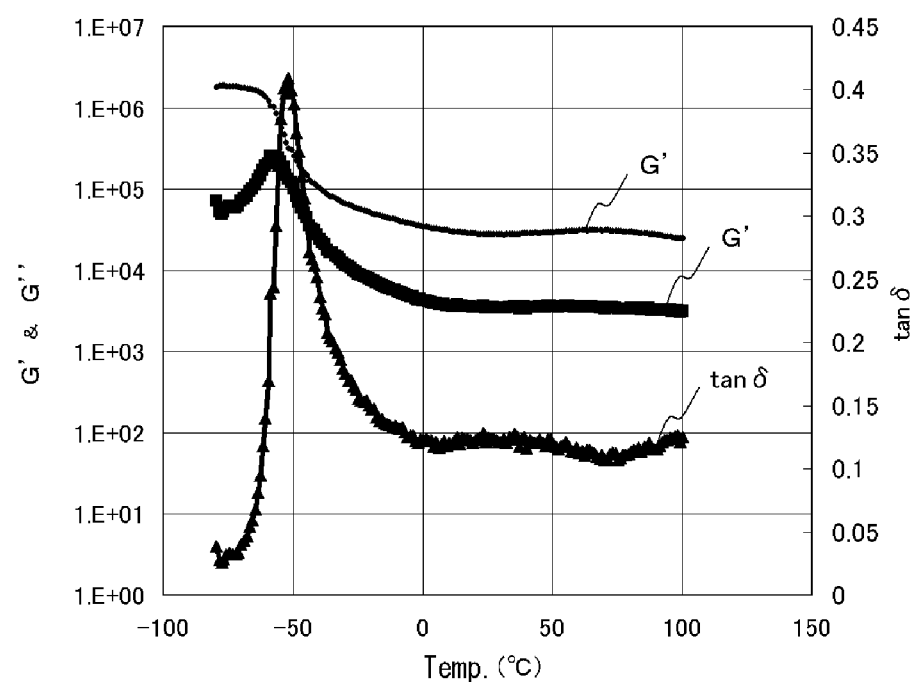
FIG. 2 is a graph illustrating correlation between a temperature, and G', G'', or tan δ in viscoelasticity measurement of the PU foam in Comparative Example 5.

FIG. 1 is a graph illustrating the measurement result of viscoelasticity by the thermal analysis instrument for the PU foam in Example 8, and FIG. 2 is a graph illustrating the result of similar measurement of the PU foam in Comparative Example 5.

TABLE 5

|  |  | Example | | | | | | |
|---|---|---|---|---|---|---|---|---|
|  |  | 1 | 2 | 3 | 4 | 5 | 6 | 7 |
| Glass transition temperature (° C.) |  | 10.3 | 17.3 | 15.4 | 23.1 | 27.4 | 31.3 | 14.9 |
| Peak value of tanδ |  | 0.31 | 0.36 | 0.42 | 0.52 | 0.61 | 0.63 | 0.41 |
| Tanδ at 10° C. to 35° C. | Minumum data | 0.25 | 0.29 | 0.28 | 0.39 | 0.29 | 0.24 | 0.27 |
|  | Maximum data | 0.31 | 0.36 | 0.42 | 0.52 | 0.61 | 0.63 | 0.41 |
| G' (×10$^4$ Pa) | Minumum data | 2.8 | 6.4 | 4.8 | 6.7 | 9.5 | 5.6 | 5.0 |
| at 10° C. to 35° C. | Maximum data | 8.5 | 33 | 27 | 76 | 180 | 130 | 26 |
|  | Ratio | 3.0 | 5.2 | 5.6 | 11.3 | 18.9 | 23.2 | 5.2 |
| Density (kg/m$^3$) |  | 44 | 45 | 41 | 41 | 42 | 41 | 41 |
| 25% hardness (kPa) |  | 1.6 | 2.6 | 2.4 | 3.8 | 4.8 | 13.1 | 2.2 |
| Modulus of resilience elasticity (%) |  | 19 | 14 | 10 | 9 | 10 | 10 | 9 |
| Compression residual strain (%) |  | 7.0 | 4.1 | 5.3 | 2.3 | 2.1 | 1.8 | 9.1 |
| Moist heat compression residual strain (%) [index] |  | 8.5 [105] | 4.7 [105] | 4.2 [105] | 4.0 [105] | 4.2 [105] | 3.0 [105] | 9.2 [105] |
| Relaxation time Dimension change (cm) | After 1 second | 8.10 | 8.11 | 7.78 | 7.15 | 6.81 | 5.92 | 8.20 |
|  | After 10 second | 8.31 | 8.50 | 8.04 | 7.70 | 7.43 | 6.61 | 8.50 |
|  | After 180 second | 8.50 | 8.64 | 8.40 | 8.39 | 8.11 | 7.51 | 8.60 |
|  | After 600 second | 8.59 | 8.64 | 8.58 | 8.50 | 8.43 | 7.89 | 8.90 |
| Ratio to after 1 second | After 10 second | 1.03 | 1.05 | 1.03 | 1.08 | 1.09 | 1.12 | 1.04 |
|  | After 180 second | 1.05 | 1.07 | 1.08 | 1.17 | 1.19 | 1.27 | 1.05 |
|  | After 600 second | 1.06 | 1.07 | 1.10 | 1.19 | 1.24 | 1.33 | 1.09 |

TABLE 6

|  |  | Example | | | | |
|---|---|---|---|---|---|---|
|  |  | 8 | 9 | 10 | 11 | 12 |
| Glass transition temperature (° C.) |  | 29.4 | 33.3 | 24.3 | 23.7 | 12.0 |
| Peak value of tanδ |  | 0.49 | 0.48 | 0.66 | 0.75 | 0.69 |
| Tanδ at 10° C. to 35° C. | Minumum data | 0.30 | 0.23 | 0.35 | 0.25 | 0.24 |
|  | Maximum data | 0.49 | 0.48 | 0.66 | 0.74 | 0.69 |
| G' (×10$^4$ Pa) | Minumum data | 10 | 21 | 12 | 6.6 | 66 |
| at 10° C. to 35° C. | Maximum data | 110 | 180 | 250 | 80 | 820 |
|  | Ratio | 11.0 | 8.6 | 20.8 | 12.1 | 12.4 |
| Density (kg/m$^3$) |  | 44 | 42 | 56 | 42 | 100 |
| 25% hardness (kPa) |  | 7.1 | 8.2 | 5.8 | 10.2 | 40 |
| Modulus of resilience elasticity (%) |  | 13 | 11 | 11 | 6 | 10 |
| Compression residual strain (%) |  | 1.7 | 2.7 | 1.8 | 3.6 | (3.2) |
| Moist heat compression residual strain (%) [index] |  | 4.2 [110] | 4.0 [115] | 1.9 [105] | 9.5 [90] | — |

TABLE 6-continued

|  |  |  | Example | | | | |
|---|---|---|---|---|---|---|---|
|  |  |  | 8 | 9 | 10 | 11 | 12 |
| Relaxation time | Dimension change (cm) | After 1 second | 7.17 | 6.13 | 7.18 | 7.00 | 2.10 |
|  |  | After 10 second | 7.71 | 6.82 | 7.70 | 7.10 | 2.77 |
|  |  | After 180 second | 8.40 | 7.76 | 8.31 | 7.30 | 3.50 |
|  |  | After 600 second | 8.54 | 8.01 | 8.51 | 7.30 | 3.92 |
|  | Ratio to after 1 second | After 10 second | 1.08 | 1.11 | 1.07 | 1.01 | 1.32 |
|  |  | After 180 second | 1.17 | 1.27 | 1.16 | 1.04 | 1.67 |
|  |  | After 600 second | 1.19 | 1.31 | 1.19 | 1.04 | 1.87 |

TABLE 7

|  |  | Comparative Example | | | | |
|---|---|---|---|---|---|---|
|  |  | 1 | 2 | 3 | 4 | 5 |
| Glass transition temperature (° C.) |  | 38.4 | 2.0 | 7.0 | −53.7 | −51.7 |
| Peak value of tanδ |  | 0.79 | 0.17 | 0.24 | 0.28 | 0.40 |
| Tanδ at 10° C. to 35° C. | Minumum data | 0.07 | 0.13 | 0.18 | 0.10 | 0.12 |
|  | Maximum data | 0.70 | 0.16 | 0.23 | 0.11 | 0.13 |
| G' (×10$^4$ Pa) at 10° C. to 35° C. | Minumum data | 60 | 2.3 | 2.6 | 0.94 | 0.29 |
|  | Maximum data | 520 | 4.7 | 3.7 | 1.20 | 0.31 |
|  | Ratio | 8.7 | 2.0 | 2.2 | 1.3 | 1.1 |
| Density (kg/m$^3$) |  | 40 | 42 | 43 | 26 | 21 |
| 25% hardness (kPa) |  | 20.5 | 1.4 | 1.5 | 13.0 | 4.5 |
| Modulus of resilience elasticity (%) |  | 12 | 23 | 20 | 35 | 35 |
| Compression residual strain (%) |  | 2.1 | 11.0 | 10.0 | 2.5 | 3.5 |
| Moist heat compression residual strain (%) [index] |  | 3.2 [100] | 15.0 [105] | 12.0 [105] | 4.5 [110] | 4.3 [105] |
| Relaxation time | Dimension change (cm) After 1 second | 4.52 | 8.61 | 8.59 | 7.80 | 8.60 |
|  | After 10 second | 5.65 | 8.65 | 8.65 | 7.90 | 8.60 |
|  | After 180 second | 6.77 | 8.65 | 8.65 | 7.90 | 8.60 |
|  | After 600 second | 7.41 | 8.65 | 8.65 | 7.90 | 8.60 |
|  | Ratio to after 1 second After 10 second | 1.25 | 1.00 | 1.01 | 1.01 | 1.00 |
|  | After 180 second | 1.50 | 1.00 | 1.01 | 1.01 | 1.00 |
|  | After 600 second | 1.64 | 1.00 | 1.01 | 1.01 | 1.00 |

TABLE 8

|  |  | Comparative Example | | |
|---|---|---|---|---|
|  |  | 6 | 7 | 8 |
| Glass transition temperature (° C.) |  | 8.4 | 36.2 | −0.64 |
| Peak value of tanδ |  | 0.46 | 0.47 | 0.63 |
| Tanδ at 10° C. to 35° C. | Minumum data | 0.26 | 0.19 | 0.17 |
|  | Maximum data | 0.46 | 0.47 | 0.38 |
| G' (×10$^4$ Pa) at 10° C. to 35° C. | Minumum data | 5.3 | 26 | 56 |
|  | Maximum data | 24 | 190 | 160 |
|  | Ratio | 4.5 | 7.3 | 2.9 |
| Density (kg/m$^3$) |  | 42 | 44 | 100 |
| 25% hardness (kPa) |  | 1.5 | 11.0 | 40 |
| Modulus of resilience elasticity (%) |  | 8 | 14 | 19 |
| Compression residual strain (%) |  | 4.0 | 6.2 | (3.2) |
| Moist heat compression residual strain (%) [index] |  | 9.6 [90] | 7.8 [122] | — |
| Relaxation time | Dimension change (cm) After 1 second | 8.59 | 4.88 | 4.28 |
|  | After 10 second | 8.65 | 5.97 | 4.52 |
|  | After 180 second | 8.65 | 6.89 | 4.53 |
|  | After 600 second | 8.65 | 7.51 | 4.53 |
|  | Ratio to after 1 second After 10 second | 1.01 | 1.22 | 1.06 |
|  | After 180 second | 1.01 | 1.41 | 1.06 |
|  | After 600 second | 1.01 | 1.54 | 1.06 |

According to the results in Table 5, Examples 1 to 6 showed that when the polyol (A) having a low molecular weight was increased, Tg became higher, and the ratio of G' also became larger. In addition, they showed tendencies that the 25% hardness became higher, and the compression residual strain was lowered. Moreover, the ratio of the dimensional change became higher with the increase of the polyol (A). When these characteristics are considered together, it is found that more excellent shape-formable performances were obtained.

Additionally, clearly from Examples 2 and 3, when the amount of bifunctional polyether polyol (B-2) was large, the modulus of resilience elasticity became lower and the ratio of the dimensional change became larger. And it is known that these are the PU foams having particularly excellent shape-formable performances. Further, according to Examples 5 and 6, when bifunctional polyol (B-2) was not used, the ratio of the dimensional change became larger, but they showed tendencies that the 25% hardness became higher, and flexibility was lowered. Moreover, Example 7 using more bifunctional polyol (B-2) showed tendencies that compression residual strain became higher, and the ratio of the dimensional change was lowered. Since the physical characteristics of the PU foam is changed according to composition of the starting material for the foam, it is preferable that the composition or the like of the starting material for the foam is selected according to the purpose and applications.

Furthermore, according to the results in Table 6, Examples 8 to 9 were ones in which the weight ratio of the polyols (A), (B-1), and (B-2) were made constant and isocyanate index was changed and showed that the Tg became higher and the compression residual strain became slightly higher when the index was increased. Additionally, when the index was 115, the ratio of the dimensional change was higher. It is found that more excellent shape-formable performances were obtained. Moreover, in Example 10 wherein a bifunctional polyol (B-2) was not used and the index was 105, the ratio of G' became higher, and the hardness was easily changed. In this case, this foam is preferably used while considering required characteristics since the density is high. Additionally, in Example 11 wherein only the polyol (A) was used and the index was lowered, rise of the Tg was suppressed by the lowered index, and the compression residual strain was favorable. In this case, this foam is preferably used while considering required characteristics similarly since the hardness in the normal temperature range is high and the moist heat compression residual strain is high.

In Example 12 wherein the HSBR foam was evaluated, due to a difference in material, the density became high, the 25% hardness was higher, and the ratio of the dimensional change became considerably larger than that of the PU foam. But this is due to the difference in material, and this foam is useful in applications such as insole, knee pad, led pad and the like used in sports and the like where such characteristics are required.

On the other hand, according to the results in Table 7, it is found that the foam had higher Tg and hardness in Comparative Example 1 in which neither of polyols (B-1) nor (B-2) was used and the index was 100. Additionally, both the modulus of resilience elasticity and compression residual strain were high and the ratio of the dimensional change was small in Comparative Examples 2 and 3 wherein the weight ratio of the polyol (A) was low, and it is assumed that sufficient shape-formable performances are not obtained.

Moreover, in Comparative Example 4 with the formulation of the general PU foam, the Tg was excessively lowered, the hardness was high, the modulus of resilience elasticity was higher, and the ratio of the dimensional change was small. Thus, it is assumed that sufficient shape-formable performances are not obtained. Additionally, in Comparative Example 5 with the formulation of the general low hardness foam, the Tg was excessively lowered, the modulus of resilience elasticity was high, the ratio of the dimensional change was also small. Thus, it is assumed that shape-formable performances are poor.

Further, according to the results in Table 8, Comparative Example 6 wherein the polyether polyols (A), (B-1) and (B-2) were used and the index was as low as 90 showed the tendencies that the compression residual strain was high, and the ratio of the dimensional change was small. Thus, it is assumed that sufficient shape-formable performances are not obtained. Additionally, Comparative Example 7 wherein the polyether polyols (A), (B-1) and (B-2) were used and the index was as high as 122 showed that the Tg became too high, the modulus of resilience elasticity was high, and the compression residual strain was also high. Thus, it is assumed that sufficient shape-formable performances are not obtained. Moreover, in Comparative Example 8 using the HSBR foam, due to the difference in material, Tg was lowered, the density and hardness were high, the modulus of resilience elasticity was also high. Thus, it is assumed that shape-formable performances are poor.

It is noted that the present invention is not limited to the description of the above Examples and can apply the various examples according to the purpose, application and the like so long as they are included in the present invention. For example, in the above Examples, each raw material was individually supplied to the mixing head, agitated and mixed so as to manufacture the foam, but the foam can be produced by mixing a polyol component wherein a foam control agent and/or catalyst and the like is formulated to a polyol to mix in advance and a polyisocyanate component together, and injecting the mixture into a molding die having a predetermined shape. Additionally, the transportation method is not limited to one with a gear pump and a high-pressure injecting machine provided with a hydraulic plunger can be used. An agitator for mechanical frothing such as Oakes mixer and Hobart mixer, and the like can be also used. From the viewpoint of mass productivity, continuous moldability and the like, a gear pump is preferably used.

The invention claimed is:

1. A shape-formable resin foam comprising:
   a flexible polyurethane foam obtained by foaming and hardening a starting material which comprises:
   two or more kinds of polyether polyols including a polyether polyol (A) which has a hydroxyl value of 200 to 500, a content of said polyether polyol (A) being in the range from 45% to 85% by weight based on 100% by weight of the total of said two or more kinds of polyether polyols;
   a polyisocyanate; and
   a foaming agent,
   a glass transition temperature of the shape-formable resin foam being in the range from 15° C. to 35° C., the glass transition temperature being expressed as a temperature corresponding to a peak value of loss tangent (tan δ), said loss tangent (tan δ) being obtained by a following formula:

$$\tan \delta = G''/G'$$

wherein G' is storage modulus and G" is loss elastic modulus, each of the storage modulus (G') and loss elastic modulus (G") being measured at a temperature range from −80° C. to 130° C., at a heating rate of 6° C./minute and at a frequency of 1 Hz,
   said loss tangent (tan δ) at a temperature of 10° C. to 35° C. being in the range from 0.20 to 0.80, and
   a ratio ($G'_{max}/G'_{mm}$) between the maximum value ($G'_{max}$) and the minimum value ($G'_{min}$) of the storage modulus (G') at a temperature of 10° C. to 35° C. being in the range from 3.0 to 30.

2. The shape-formable resin foam according to claim 1, wherein said shape-formable resin foam has a ratio ($L_2/L_1$) between a dimension change after 1 second ($L_1$) and a dimensional change after 180 seconds ($L_2$) in a downward dimensional change of a sheet with length of 180× 180 mm and a thickness of 10 mm formed using said shape-formable resin foam is in the range from 1.05 to 1.50, when said sheet is fixed at four sides and then a spherical body that has a diameter of 132 mm and a weight of 1,200 g, and is heated to a temperature of 35° C. is loaded at a center part of said sheet.

3. The shape-formable resin foam according to claim 1, wherein said ratio ($G'_{max}/G'_{min}$) is in the range from 5.0 to 25.

4. The shape-formable resin foam according to claim 1, wherein said two or more kinds of polyether polyols further includes a polyether polyol (B-1) having a hydroxyl value of 40 to 100 and a functional group number of 3 and a polyether polyol (B-2) having a hydroxyl value of 40 to 100 and a functional group number of 2, and wherein a content of said polyether polyol (B-2) is in the range from 5% to 25% by weight based on 100% by weight of the total of said two or more kinds of polyether polyols.

5. The shape-formable resin foam according to claim 1, wherein said polyether polyol (A) is obtained by chain extension using an alkylene oxide, and
wherein said alkylene oxide contains propylene oxide in an amount of 80% or more by weight based on 100% by weight of said alkylene oxide.

6. The shape-formable resin foam according to claim 4, wherein each of said polyether polyol (A), said polyether polyol (B-1), and said polyether polyol (B-2) is obtained by chain extension using an alkylene oxide, and
wherein said alkylene oxide contains propylene oxide in an amount of 80% or more by weight based on 100% by weight of said alkylene oxide.

7. The shape-formable resin foam according to claim 1, wherein said polyisocyanate is toluene diisocyanate.

8. The shape-formable resin foam according to claim 1, wherein an isocyanate index for the production of said flexible polyurethane foam is in the range from 100 to 120.

9. The shape-formable resin foam according to claim 1, wherein said shape-formable resin foam has a ratio ($L_2/L_1$) between a dimension change after 1 second ($L_1$) and a dimensional change after 180 seconds ($L_2$) in a downward dimensional change of a sheet with length of 180× 180 mm and a thickness of 10 mm formed using said shape-formable resin foam is in the range from 1.05 to 1.50, when said sheet is fixed at four sides and then a spherical body that has a diameter of 132 mm and a weight of 1,200 g, and is heated to a temperature of 35° C. is loaded at a center part of said sheet,
wherein said two or more kinds of polyether polyols further includes a polyether polyol (B-1) having a hydroxyl value of 40 to 100 and a functional group number of 3, and a polyether polyol (B-2) having a hydroxyl value of 40 to 100 and a functional group number of 2,
wherein a content of said polyether polyol (B-2) is 5% to 25% by weight based on 100% by weight of said two or more kinds of polyether polyols,
wherein each of said polyether polyol (A), said polyether polyol (B-1), and said polyether polyol (B-2) is obtained by chain extension using an alkylene oxide,
wherein said alkylene oxide contains propylene oxide in an amount of 80% or more by weight based on 100% by weight of said alkylene oxide,
wherein said polyisocyanate is toluene diisocyanate, and
wherein an isocyanate index for the production of said flexible polyurethane foam is in the range from 100 to 120.

10. A method of using a molded article made of the shape-formable resin foam according to claim 1, comprising:
attaching said molded article to a surface of a human body; and
lowering the hardness of said molded article due to heat transferred from said human body so as to deform said molded article by allowing to follow-up the shape of the body surface.

11. The method according to claim 10,
wherein said two or more kinds of polyether polyols further includes a polyether polyol (B-1) having a hydroxyl value of 40 to 100 and a functional group number of 3, and a polyether polyol (B-2) having a hydroxyl value of 40 to 100 and a functional group number of 2,
wherein a content-of said polyether polyol (B-2) is 5% to 25% by weight based on 100% by weight of said two or more kinds of polyether polyols,
wherein each of said polyether polyol (A), said polyether polyol (B-1), and said polyether polyol (B-2) is obtained by chain extension using an alkylene oxide,
wherein said alkylene oxide contains propylene oxide in an amount of 80% or more by weight based on 100% by weight of said alkylene oxide,
wherein said polyisocyanate is toluene diisocyanate, and
wherein an isocyanate index for the production of said flexible polyurethane foam is in the range from 100 to 120.

12. A cushioning material for attaching to a human body,
wherein said cushioning material is consisting of a molded article made of the shape-formable resin foam according to claim 1.

13. The cushioning material for attaching to a human body according to claim 12,
wherein said two or more kinds of polyether polyols further includes a polyether polyol (B-1) having a hydroxyl value of 40 to 100 and a functional group number of 3, and a polyether polyol (B-2) having a hydroxyl value of 40 to 100 and a functional group number of 2,
wherein a content said polyether polyol (B-2) is 5% to 25% by weight based on 100% by weight of said two or more kinds of polyether polyols,
wherein each of said polyether polyol (A), said polyether polyol (B-1), and said polyether polyol (B-2) is obtained by chain extension using an alkylene oxide,
wherein said alkylene oxide contains propylene oxide in an amount of 80% or more by weight based on 100% by weight of said alkylene oxide,
wherein said polyisocyanate is toluene diisocyanate, and
wherein an isocyanate index for the production of said flexible polyurethane foam is in the range from 100 to 120.

14. The cushioning material for attaching to a human body according to claim 13,
wherein said molded article is a bra cup.

15. The shape-formable resin foam according to claim 1, wherein said polyisocyanate includes toluene diisocyanate.

16. The shape-formable resin foam according to claim 1, wherein the polyether polyol (A) is bifunctional or trifunctional.

17. The shape-formable resin foam according to claim 1, wherein a density of the shape-formable resin foam is from 41 to 100 kg/m$^3$.

* * * * *